(12) United States Patent  
Uehata

(10) Patent No.: US 12,461,700 B2
(45) Date of Patent: Nov. 4, 2025

(54) INFORMATION PROCESSING DEVICE, INFORMATION PROCESSING SYSTEM, PROGRAM AND RECORDING MEDIUM FOR ANALYZING TYPES AND QUANTITIES OF COMPONENTS CONTAINED IN BIOLOGICAL SPECIMENTS

(71) Applicant: ARKRAY, Inc., Kyoto (JP)

(72) Inventor: Yoshiharu Uehata, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 0 days.

(21) Appl. No.: 18/913,747

(22) Filed: Oct. 11, 2024

(65) Prior Publication Data

US 2025/0123783 A1 Apr. 17, 2025

(30) Foreign Application Priority Data

Oct. 16, 2023 (JP) ................................. 2023-178370

(51) Int. Cl.
 *G06F 3/14* (2006.01)
(52) U.S. Cl.
 CPC ...................................... *G06F 3/14* (2013.01)
(58) Field of Classification Search
 CPC .......................................................... G06F 3/14
 See application file for complete search history.

(56) References Cited

U.S. PATENT DOCUMENTS

| 2013/0114100 A1 | 5/2013 | Torii et al. |
| 2014/0146179 A1 | 5/2014 | Harada et al. |
| 2019/0121613 A1* | 4/2019 | Chang ................ G06Q 20/3224 |

FOREIGN PATENT DOCUMENTS

| JP | 2008-083966 A | 4/2008 |
| JP | 2022-015470 A | 1/2022 |

OTHER PUBLICATIONS

Extended European Search Report issued in EP 24 20 6669.4-1218 by the European Patent Office on Feb. 27, 2025, which is related to U.S. Appl. No. 18/913,747.

* cited by examiner

*Primary Examiner* — Gustavo Polo
(74) *Attorney, Agent, or Firm* — Studebaker Brackett PLLC

(57) ABSTRACT

An information processing device includes a memorization unit, an image capture unit, an identification unit, an acquisition unit and a display unit. The memorization unit memorizes display information to be displayed in correspondence with parts of an apparatus. The image capture unit captures an image of the apparatus. The identification unit identifies a part of the apparatus included in an image that has been captured or is being captured by the image capture unit. The acquisition unit acquires, from the memorization unit, display information that is to be displayed in correspondence with the part of the apparatus identified by the identification unit. The display unit displays the display information acquired by the acquisition unit.

11 Claims, 17 Drawing Sheets

FIG.6

ENTRY OF MODEL INFORMATION

ENTER INFORMATION ABOUT THE SUBJECT APPARATUS

MODEL NAME: ABC-1234A

DESTINATION AREA: JAPAN

CANCEL

CONFIRM

10

FIG.16
REPAIR GUIDANCE INFORMATION DISPLAY EXAMPLE
AAA UNIT REPLACEMENT PROCEDURE
UNSCREW THESE SCREWS.
THEN REMOVE THIS COMPONENT
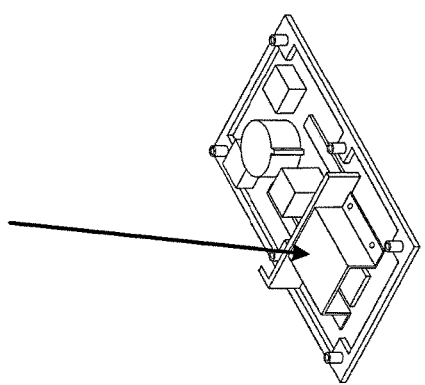
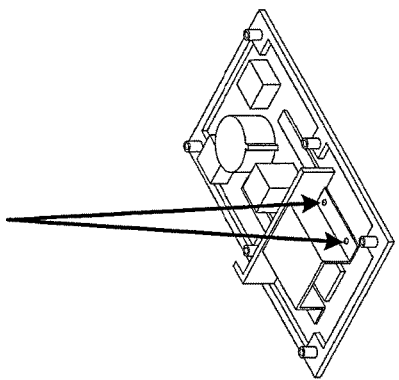

FIG.17
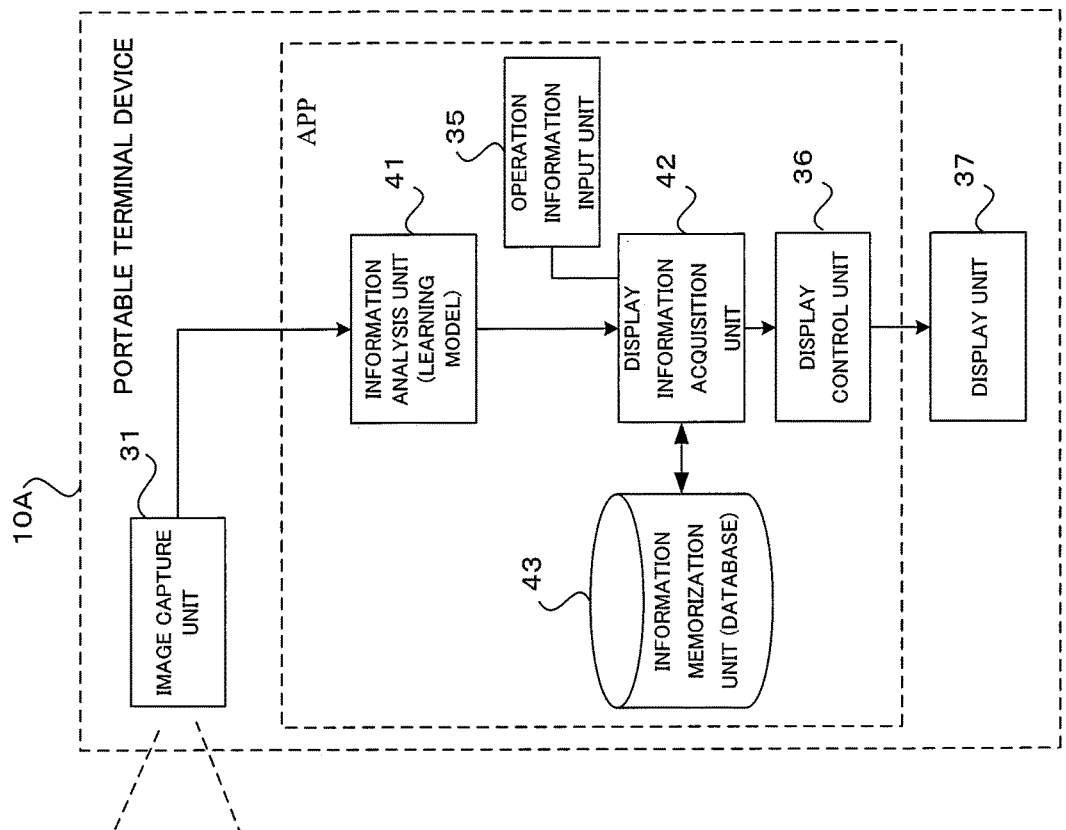
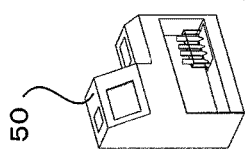
CONFIGURATION EXAMPLE
WITH JUST A PORTABLE
TERMINAL DEVICE

INFORMATION PROCESSING DEVICE, INFORMATION PROCESSING SYSTEM, PROGRAM AND RECORDING MEDIUM FOR ANALYZING TYPES AND QUANTITIES OF COMPONENTS CONTAINED IN BIOLOGICAL SPECIMENTS

CROSS-REFERENCE TO RELATED APPLICATION

The present application claims priority under 35 U.S.C. § 119 to Japanese Patent Application No. 2023-178370 filed on Oct. 16, 2023, the disclosure of which is incorporated by reference herein.

BACKGROUND

Technical Field

The present disclosure relates to an information processing device, an information processing system, a program and a recording medium.

Related Art

Various types of apparatus are used as automatic analysis devices for analyzing types and quantities of components contained in biological specimens of blood, urine and the like sampled from human bodies. Plural types of automatic analysis device may be employed in a single institute. In particular, when measurements of plural indicators are analyzed in the same institute, multiple automatic analysis devices from different manufacturers are often used in combination.

Therefore, a user wishing to use these apparatuses must study the apparatus models, operate each apparatus in accordance with the content of a user manual for that apparatus, and carry out basic maintenance tasks.

There may also be many versions of software programs that are installed for controlling operations of the automatic analysis devices. Depending on differences between old and new versions of a software program, for example, the design of an operation screen layout may change, and numbers, text fonts, positions and the like of operation buttons may change.

In addition to users making use of the automatic analysis devices, customer service staff from manufacturers (below referred to as service people) who repair the automatic analysis devices must also use the user manuals. It is usual for service people to carry dedicated service manuals for service people and to use the service manuals during repair services.

User manuals and service manuals as mentioned above are often supplied as electronic media connected to terminal devices, at the same time as printed paper publications. Accordingly, for example, Japanese Patent Application Laid-Open (JP-A) Nos. 2008-83966 and 2022-15470 have proposed systems in which code information such as a QR code (registered trademark) or the like is displayed at a subject apparatus, and when this code information is read by a portable terminal device, a user manual, support information or the like for the subject apparatus is acquired from a management server.

However, a user who is unfamiliar with apparatus operations may not understand which operations will be effective to achieve an operation objective just by looking at a user manual. Furthermore, a service person who is not familiar with the structure of an apparatus may not know which parts of a service manual to look at and what repair methods to use, even for removing an apparatus housing to carry out a repair of the interior.

An object of the present disclosure is to provide an information processing device, an information processing system, a program and a recording medium that may, simply by a part of an apparatus being imaged, display display information corresponding to that part of the apparatus.

SUMMARY

A first aspect of the present disclosure includes: a memorization unit that memorizes display information to be displayed in correspondence with parts of an apparatus; an image capture unit that captures an image of the apparatus; an identification unit that identifies a part of the apparatus included in an image that has been captured or is being captured by the image capture unit; an acquisition unit that acquires, from the memorization unit, the display information that is to be displayed in correspondence with the part of the apparatus identified by the identification unit; and a display unit that displays the display information acquired by the acquisition unit.

According to the present disclosure, an effect may be provided in that, simply by a part of an apparatus being imaged, display information corresponding to that part of the apparatus may be displayed.

BRIEF DESCRIPTION OF THE DRAWINGS

Exemplary embodiments will be described in detail based on the following figures, wherein:

FIG. 6 is a view showing an operation screen example when an operation information input unit 35 accepts entry of information such as a model name and destination area of the subject apparatus 50 from a user.

FIG. 16 is a view showing a situation in which image information presenting a repair procedure is displayed as repair guidance information.

FIG. 17 is a block diagram showing functional structures of a portable terminal device 10A that incorporates functions of a server device 20.

DETAILED DESCRIPTION

An exemplary embodiment of the present disclosure is described in detail with reference to the drawings.

Below, an example of an embodiment relating to the present disclosure is described in accordance with the drawings. Structural elements and processes that are responsible for the same operations and functions may be assigned the same reference symbols in all the drawings and duplicative descriptions thereof may be omitted as appropriate. The drawings are schematically illustrated only to an extent required to enable proper understanding of the present disclosure. Therefore, the technology of the present disclosure is not limited only to the illustrated examples. In the present exemplary embodiment, descriptions of structures that are not directly related to the present disclosure, peripheral structures and the like may be omitted.

Figure 1:
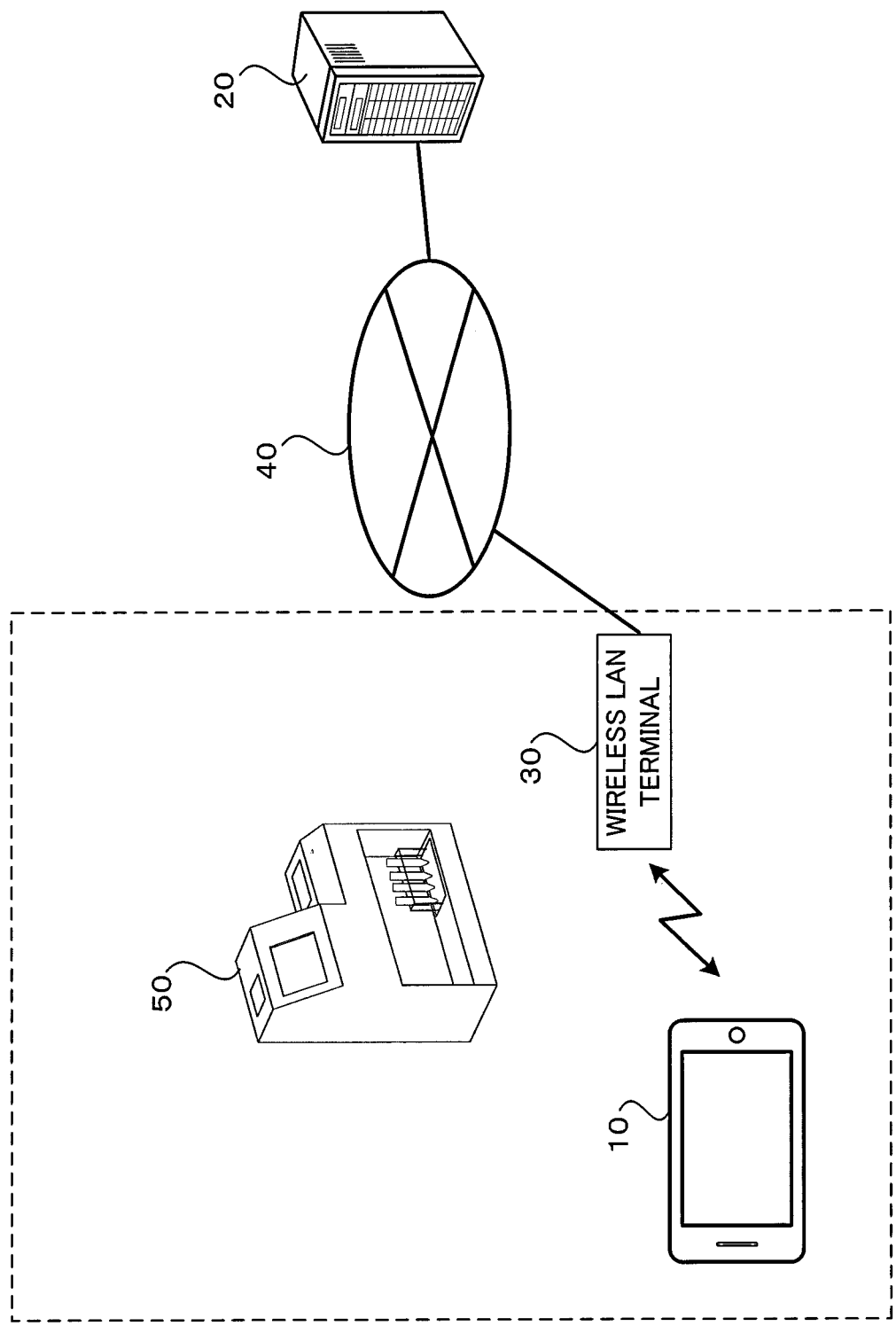
FIG. 1 is a diagram showing system structures of an information processing system according to an exemplary embodiment of the present disclosure.

FIG. 1 is a diagram showing system structures of an information processing system according to the exemplary embodiment of the present disclosure.

An information processing system according to the present exemplary embodiment uses an automatic analysis device disposed in an institute, such as a diabetes testing device, a urine testing device or the like, as the subject apparatus 50. This information processing system is for displaying information such as operation guidance, repair guidance and the like.

The information processing system is configured with the portable terminal device 10, such as a smartphone, a tablet terminal or the like, and the server device 20.

The server device 20 stores operation guidance information and a user manual presenting operation procedures of the subject apparatus 50, and repair guidance information and a service manual presenting procedures for repairing non-functioning parts of the subject apparatus 50.

The portable terminal device 10 and the server device 20 are connected to one another via a wireless LAN terminal 30 and an Internet 40.

Hardware structures of the portable terminal device 10 mentioned above are shown in the block diagram of FIG. 2.

Figure 2:
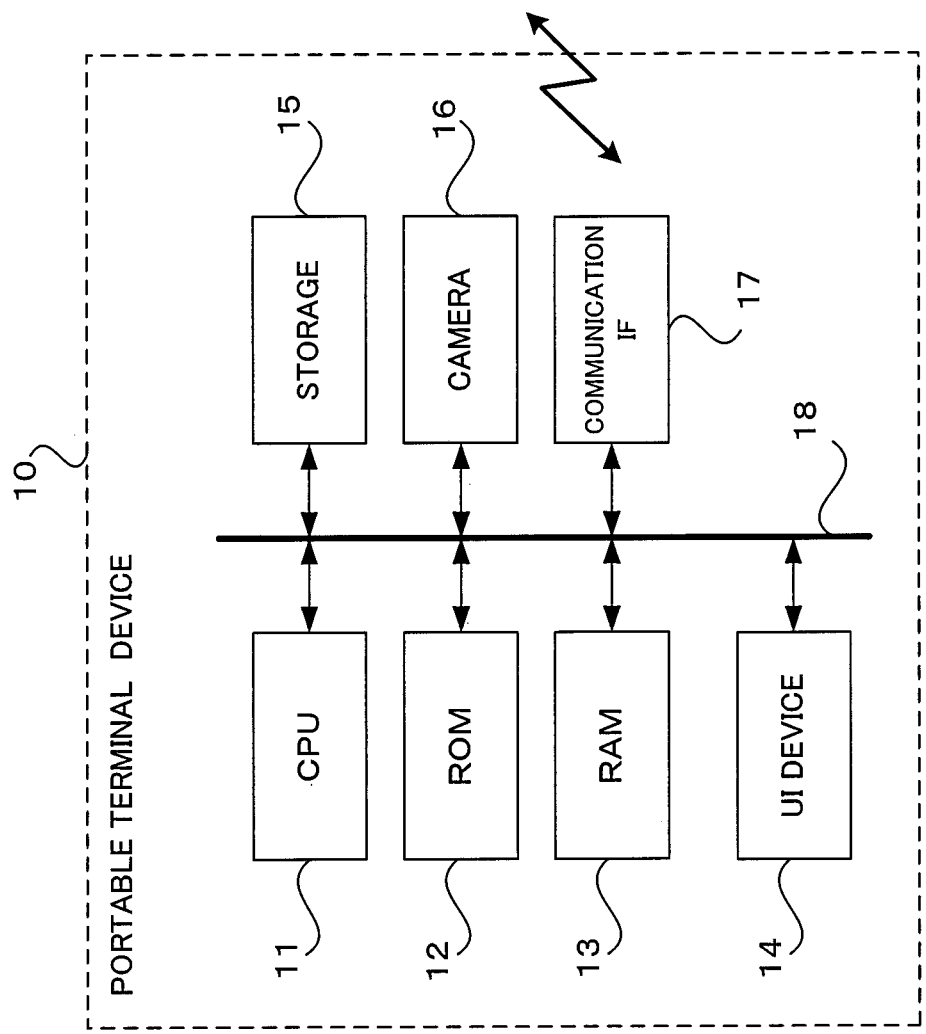
FIG. 2 is a block diagram showing hardware structures of a portable terminal device 10 according to the exemplary embodiment of the present disclosure.

As shown in FIG. 2, the portable terminal device 10 includes a central processing unit (CPU) 11, read-only memory (ROM) 12, random access memory (RAM) 13, a user interface (UI) device 14, storage 15, a camera 16 and a communications interface (IF) 17. These structures are connected to be capable of communicating with one another via a control bus 18.

The ROM 12 memorizes various programs and various kinds of data. The RAM 13 serves as a work area and temporarily memorizes programs and data. The storage 15 is structured with a hard disk drive (HDD) or solid-state drive (SSD). The storage 15 stores various programs, including an operating system, and various kinds of data.

The CPU 11 (an example of a processor) is a central arithmetic processing unit, which executes various programs and controls various units. That is, the CPU 11 reads a program from the ROM 12 or the storage 15 and executes the program using the RAM 13 as a work area. The CPU 11 conducts control of the above-mentioned structures and various computations in accordance with the program memorized at the ROM 12 or storage 15.

Hardware structures of the server device 20 mentioned above are shown in the block diagram of FIG. 3.

Figure 3:
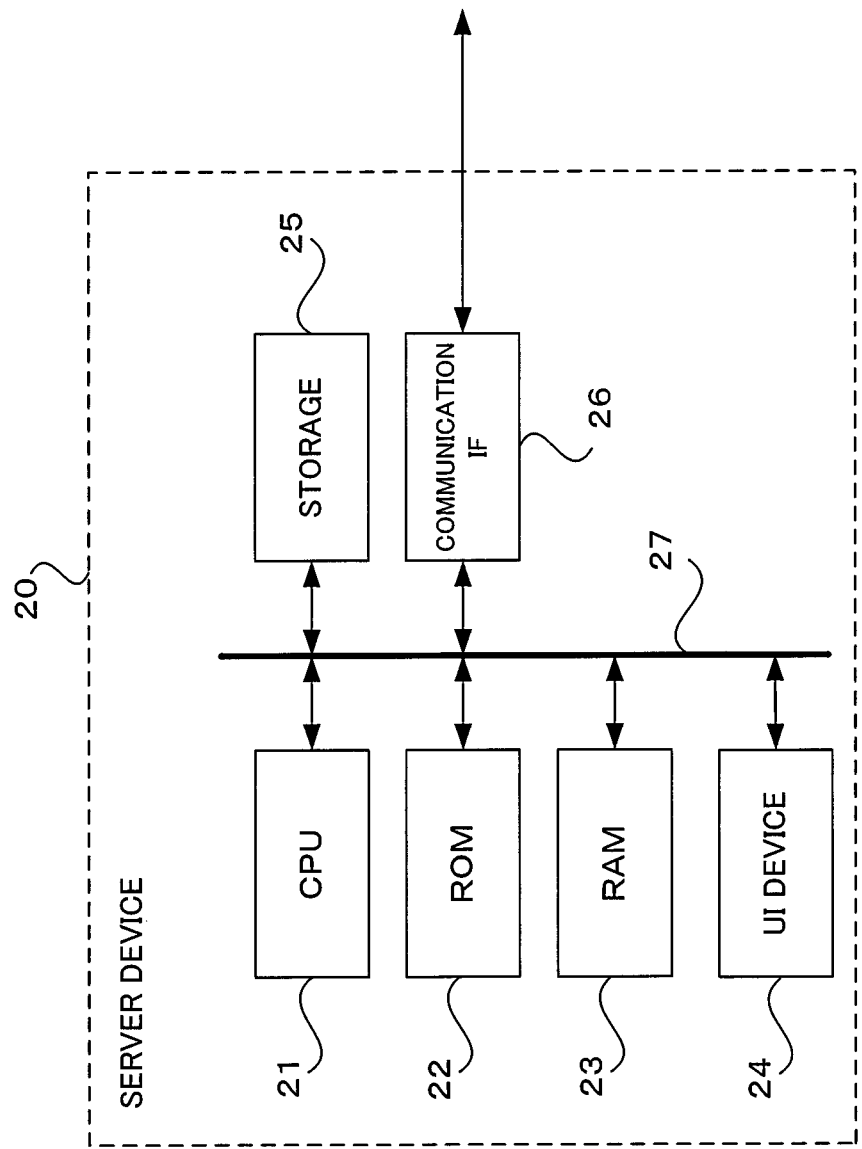
FIG. 3 is a block diagram showing hardware structures of a server device 20 according to the exemplary embodiment of the present disclosure.

As shown in FIG. 3, the server device 20 includes a CPU 21, ROM 22, RAM 23, UI device 24, storage 25 and a communications interface (IF) 26. These structures are connected to be capable of communicating with one another via a control bus 27.

The ROM 22 memorizes various programs and various kinds of data. The RAM 23 serves as a work area and temporarily memorizes programs and data. The storage 25 is structured with an HDD or SSD. The storage 25 stores various programs, including an operating system, and various kinds of data.

The CPU 21 is a central arithmetic processing unit, which executes various programs and controls various units. That is, the CPU 21 reads a program from the ROM 22 or the storage 25 and executes the program using the RAM 23 as a work area. The CPU 21 conducts control of the above-mentioned structures and various computations in accordance with the program memorized at the ROM 22 or storage 25.

Functional structures of the portable terminal device 10 and server device 20 structured as described above are shown in the block diagram of FIG. 4.

Figure 4:
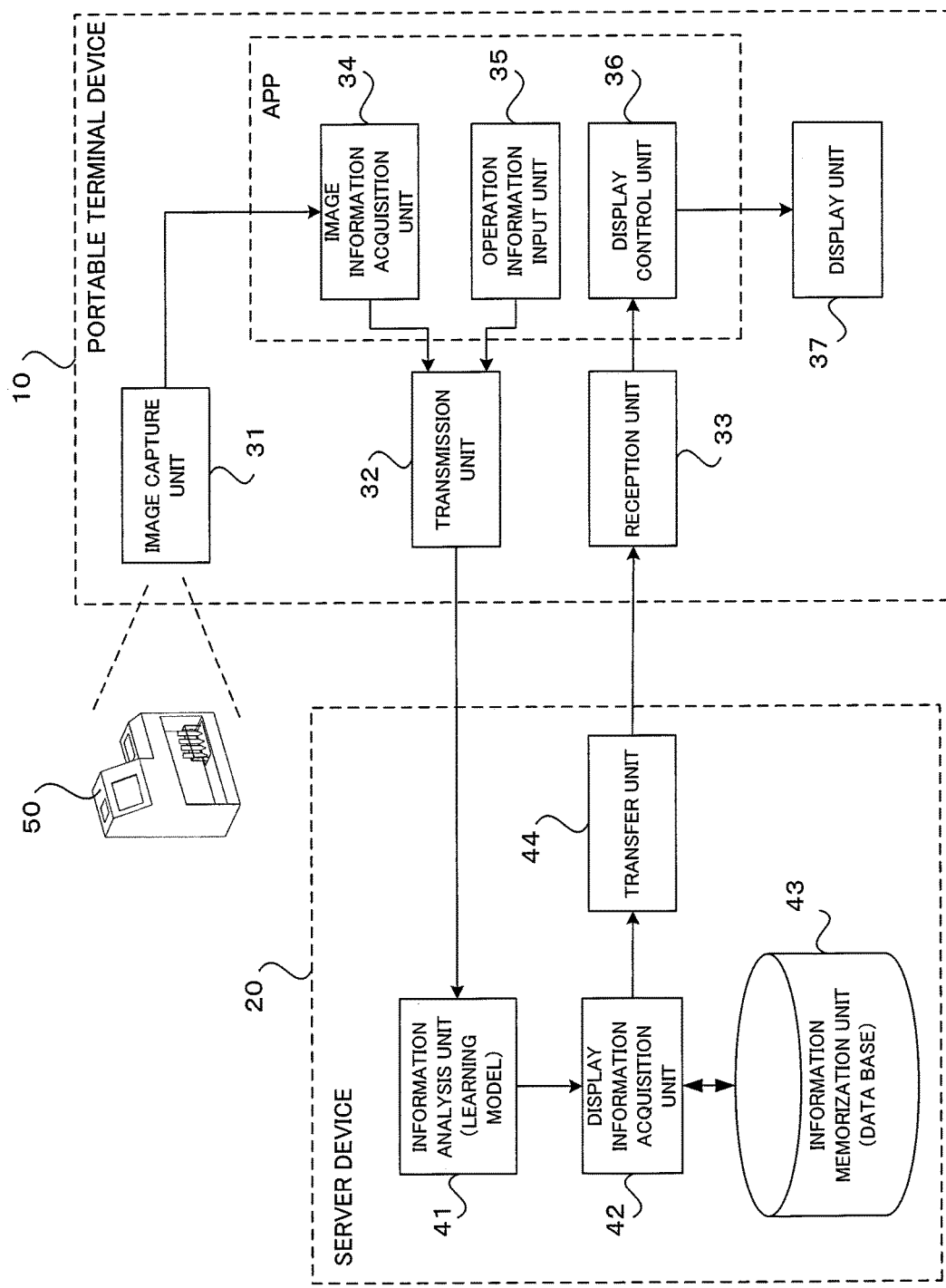
FIG. 4 is a block diagram showing functional structures of the portable terminal device 10 and the server device 20.

As shown in FIG. 4, the portable terminal device 10 is provided with the image capture unit 31, a transmission unit 32, a reception unit 33, an image information acquisition unit 34, the operation information input unit 35, a display control unit 36 and the display unit 37.

The image information acquisition unit 34, operation information input unit 35 and display control unit 36 are realized by installation of an application program (below referred to as "the app") at the portable terminal device 10.

As shown in FIG. 4, the server device 20 is provided with an information analysis unit 41, a display information acquisition unit 42, an information memorization unit 43 and a transfer unit 44.

The image capture unit 31 captures an image of the subject apparatus 50 for which operation guidance or repair guidance is to be displayed.

The image information acquisition unit 34 acquires image data of the subject apparatus 50 that has been imaged or is being imaged by the image capture unit 31.

The operation information input unit 35 accepts entry of information relating to the subject apparatus 50 from the user. More specifically, the operation information input unit 35 accepts entry of one or more of model name information of the subject apparatus 50, destination area information of the subject apparatus 50, unit name information of an internal part of the subject apparatus 50 imaged by the image capture unit 31, information relating to an operation objective of the user, attribute information of the user, and user identification information.

The transmission unit 32 transmits, to the server device 20, the image data of the subject apparatus 50 captured by the image capture unit 31 and acquired by the image information acquisition unit 34 and the entry information from the user accepted by the operation information input unit 35.

The reception unit 33 receives display information transferred from the server device 20, which is an external device, and more specifically display information transferred from the transfer unit 44 of the server device 20.

The display control unit 36 causes display information received by the reception unit 33 to be displayed at the display unit 37.

On the basis of control by the display control unit 36, the display unit 37 displays display information acquired by the display information acquisition unit 42 and transferred via the transfer unit 44 and the reception unit 33. In other words, the display unit 37 displays the display information received by the reception unit 33.

In this exemplary embodiment, the display unit 37 displays the display information acquired by the display information acquisition unit 42 superimposed at a position corresponding with a position of the subject apparatus 50 in the image captured by the image capture unit 31.

For example, when a display panel of the subject apparatus 50 is imaged by the image capture unit 31, the display unit 37 displays operation guidance information superimposed on the display panel in the captured image.

As a further example, when an internal part of the subject apparatus 50 is imaged by the image capture unit 31, the display unit 37 displays information, such as repair guidance information presenting a repair procedure for repairing a site of malfunction, names of components of the internal part or the like, superimposed on the components of the internal part and the like in the captured image.

The information analysis unit 41 functions as an identification unit that receives information, such as image data of the subject apparatus 50 transferred from the transmission unit 32 of the portable terminal device 10 and the like, and identifies a part of the subject apparatus 50 included in the image captured by the image capture unit 31.

An image analysis model is prepared in advance at the information analysis unit 41. The image analysis model is built beforehand of correspondences between numerous images relating to the subject apparatus 50 and parts of the subject apparatus 50 corresponding to the numerous images.

The image analysis model may be a trained learning model that is created by machine learning using training data constituted of the numerous images relating to the subject apparatus 50 and the parts of the subject apparatus 50 corresponding to the numerous images.

The information analysis unit 41 uses the image analysis model built as described above to identify a part of the subject apparatus 50 contained in an image captured by the image capture unit 31.

When machining learning of the learning model is being conducted and operation guidance is to be displayed, the teaching data used for the training is training data formed of captured images of the display panel of the subject apparatus 50, information on a model name, destination area and the like of the subject apparatus 50, version information of a software program installed at the subject apparatus 50, and display information that is to be displayed superimposed on the display panel.

When machining learning of the learning model is being conducted and repair guidance is to be displayed, the teaching data used for the training is training data formed of captured images of internal parts of the subject apparatus 50, information on the model name, destination area and the like of the subject apparatus 50, and display information relating to internal parts that is to be displayed.

The information memorization unit 43 is a database memorizing display information to be displayed in correspondence with the display panel, internal parts and the like of the subject apparatus 50.

When operation guidance is to be displayed, the display information memorized at the information memorization unit 43 is operation guidance information for showing a user which operations of the subject apparatus 50 are suitable to achieve a certain operation objective, and user manual information of the subject apparatus 50.

When repair guidance is to be displayed, the display information memorized at the information memorization unit 43 includes at least one of service manual information for repairing an internal part of the subject apparatus 50, information relating to component names of the internal part, and repair guidance information presenting a procedure for repairing the internal part.

The display information acquisition unit 42 acquires, from the information memorization unit 43, display information to be displayed in correspondence with a part of the subject apparatus 50 identified by the information analysis unit 41.

For example, when the part of the subject apparatus 50 identified by the information analysis unit 41 is the display panel of the subject apparatus 50, the display information acquisition unit 42 acquires operation guidance information that corresponds with display contents of the display panel from the information memorization unit 43 to be the display information.

As a further example, when the part of the subject apparatus 50 identified by the information analysis unit 41 is an internal part of the subject apparatus 50, the display information acquisition unit 42 acquires information relating to that internal part from the information memorization unit 43 to be the display information.

Information of a model name of the subject apparatus 50 and type information relating to the subject apparatus 50, such as destination area information and the like, may be entered at the operation information input unit 35 of the portable terminal device 10 and transferred via the transmission unit 32 to the server device 20. In this situation, the display information acquisition unit 42 refers to the information relating to the subject apparatus 50 accepted by the operation information input unit 35 when acquiring display information corresponding to a location of the subject apparatus 50 acquired by the information analysis unit 41 from the information memorization unit 43.

The transfer unit 44 transfers the display information acquired by the display information acquisition unit 42 to the portable terminal device 10.

There may be many versions of a software program installed for controlling operations of the subject apparatus 50. Depending on differences between old and new versions of the software program, the layouts of operation screens displayed in the display panel may change, and numbers, text fonts, positions and the like of operation buttons may change.

Therefore, the information analysis unit 41 may determine the version of the software program installed at the subject apparatus 50 on the basis of display contents displayed at the display panel.

In this situation, the display information acquisition unit 42 acquires operation guidance information corresponding to the version of the software program determined by the information analysis unit 41 from the information memorization unit 43 to be the display information.

Now, operation of the information processing system according to the exemplary embodiment of the present disclosure is described in detail with reference to the drawings.

Operation Guidance Display

Figure 5:
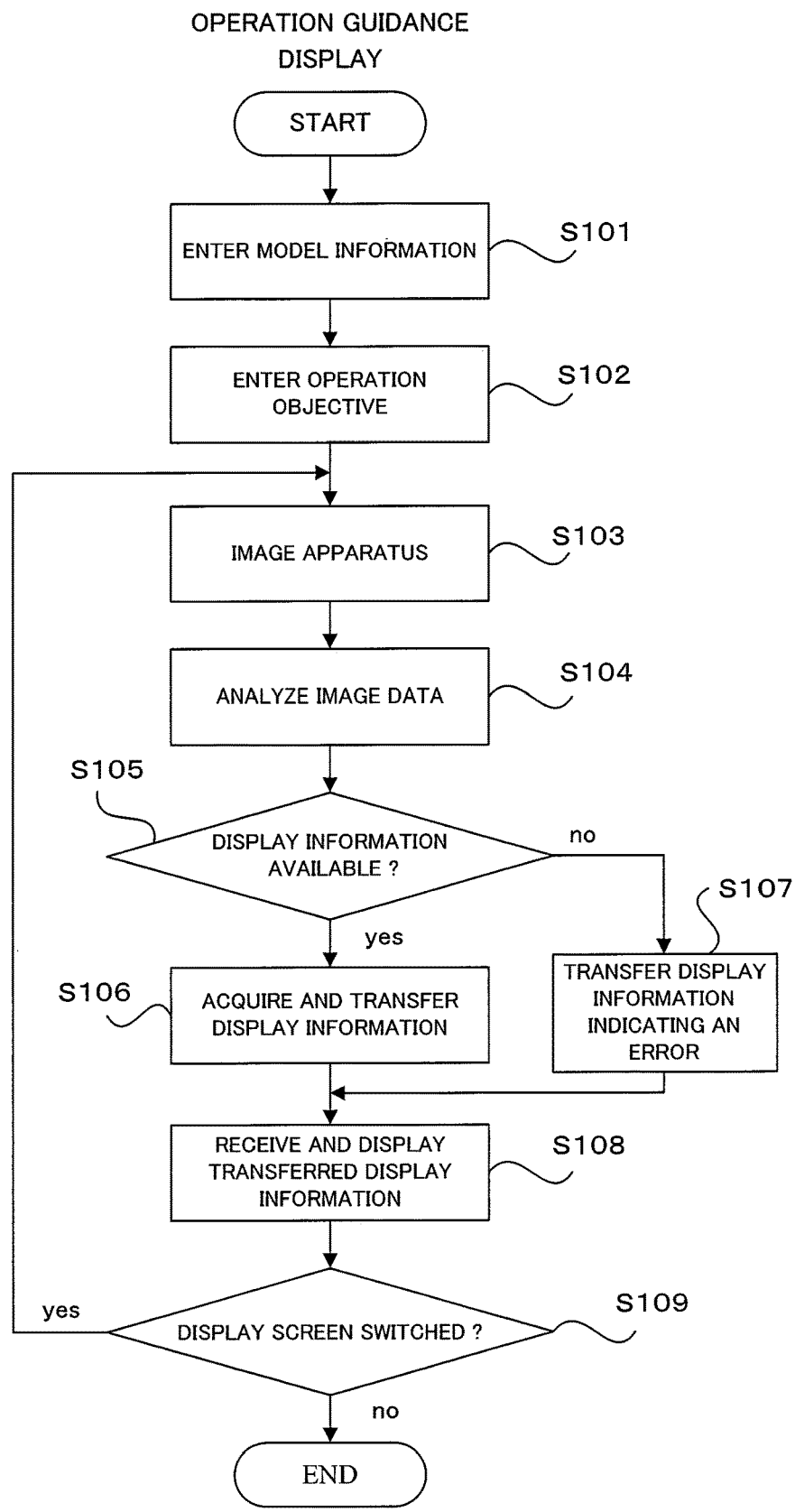
FIG. 5 is a flowchart describing operations when a user images a subject apparatus 50 with the portable terminal device 10 and a guidance operation display is implemented.

First, operation when a user images the subject apparatus 50 with the portable terminal device 10 and operation guidance is displayed is described with reference to the flowchart of FIG. 5.

First, the operation information input unit 35 of the portable terminal device 10 accepts entry of model information of the subject apparatus 50 for which operation guidance is to be displayed (step S101).

For example, the operation information input unit 35 accepts entry from a user of information on the model name, destination area and the like of the subject apparatus 50 through an operation screen as illustrated in FIG. 6.

Then, the operation information input unit 35 of the portable terminal device 10 accepts entry of the objective of an operation that the user is trying to perform on the subject apparatus 50 (step S102).

Figure 7:
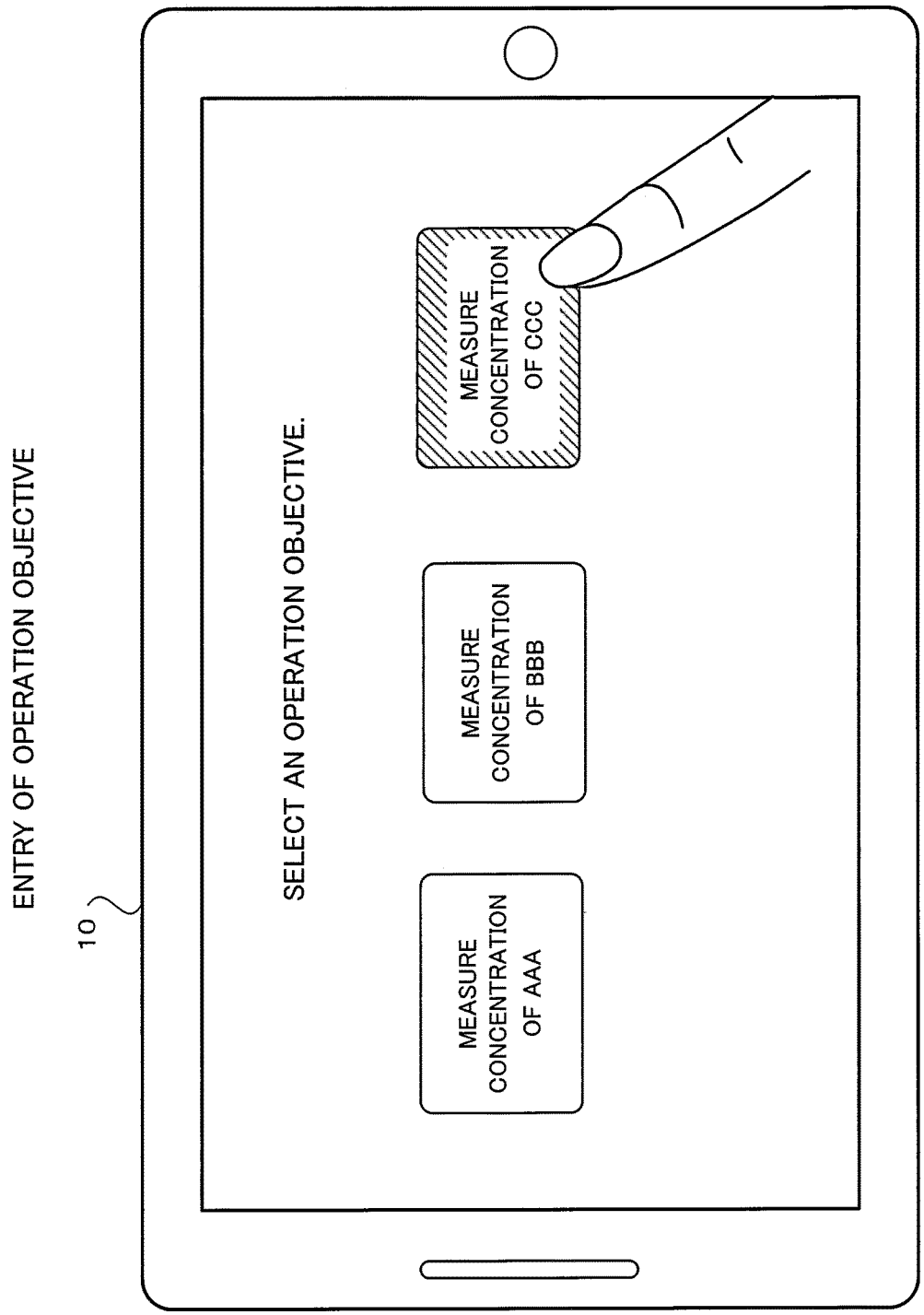
FIG. 7 is a view showing an operation screen example when the operation information input unit 35 accepts entry from a user of an operation objective of an operation that the user is to perform subsequently.

For example, as illustrated in FIG. 7, the operation information input unit 35 accepts entry from the user of an operational objective of the operation the user is trying to perform, by the user selecting an operation objective from among plural operation objectives.

Figure 8:
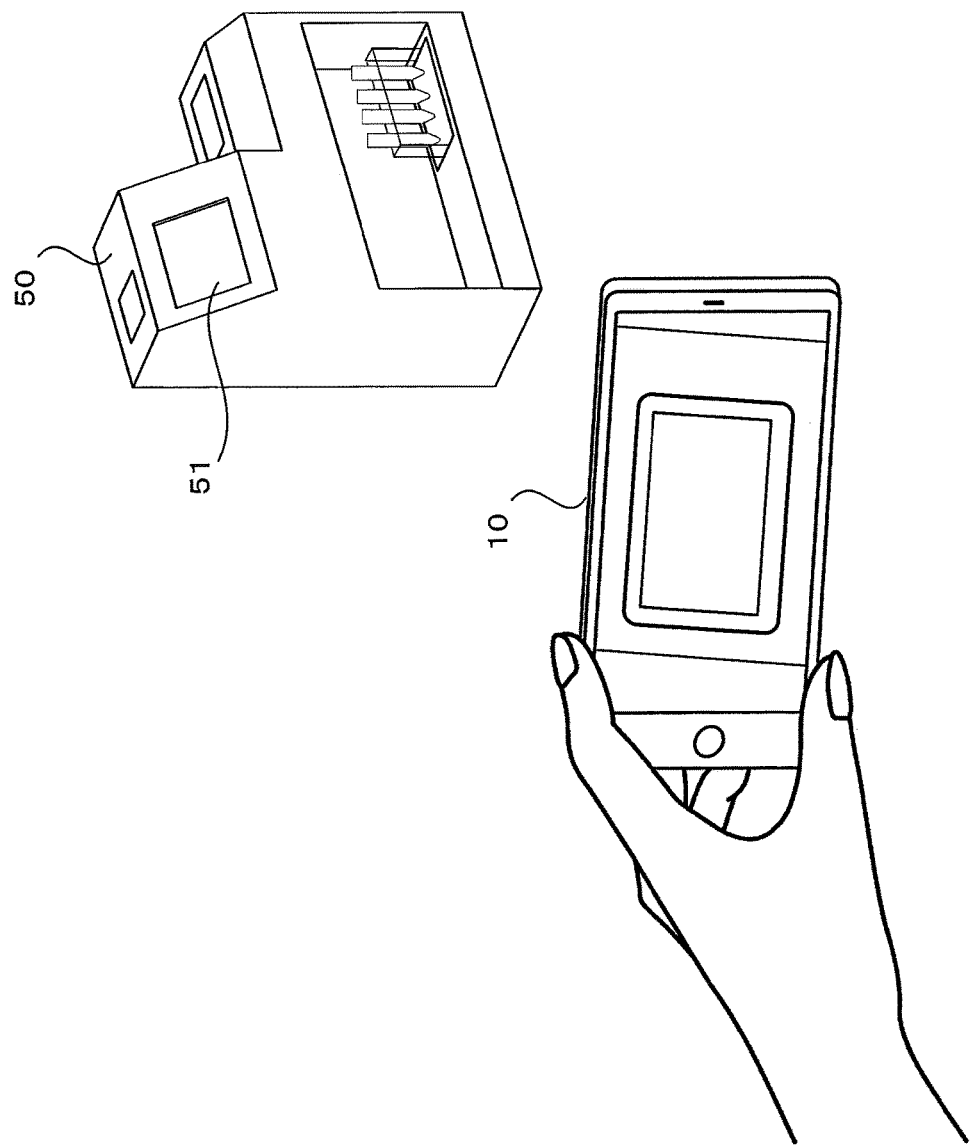
FIG. 8 is a view describing a situation in which a display panel 51 of the subject apparatus 50 is imaged by an image capture unit 31.

Then, imaging of the subject apparatus 50 is implemented by the image capture unit 31 (step S103). Because the aim is to display operation guidance, as illustrated in FIG. 8, the display panel 51 of the subject apparatus 50 is imaged by the image capture unit 31. This imaging by the image capture unit 31 need not be capture of a still image; a moving image of the display panel 51 may be captured by the image capture unit 31.

Correspondingly, image data of the display panel 51 captured by the image capture unit 31 and information such as apparatus information, an operation objective and the like accepted by the operation information input unit 35 are transmitted to the server device 20 by the transmission unit 32. At the server device 20, an analysis of the transmitted image data is carried out by the information analysis unit 41 using the trained learning model. Thus, from the image of the display panel 51 in the image data, the information analysis unit 41 identifies the version of the software installed at the subject apparatus 50, identifies an operation screen currently being displayed, and so forth (step S104). Hence, the information analysis unit 41 determines whether or not display information to be displayed in correspondence with the current operation screen is available (step S105).

When the information analysis unit 41 determines that display information to be displayed with the current operation screen is available, the display information acquisition unit 42 acquires the display information to be displayed from the information memorization unit 43, and the acquired display information is transferred to the portable terminal device 10 by the transfer unit 44 (step S106).

However, when the information analysis unit 41 determines that no display information to be displayed with the current operation screen is available, the display information acquisition unit 42 transfers display information indicating an error to the portable terminal device 10 through the transfer unit 44 (step S107).

At the portable terminal device 10, the display information transferred from the server device 20 is received by the reception unit 33, and the received display information is displayed at the display unit 37 by the display control unit 36 (step S108).

Figure 9:
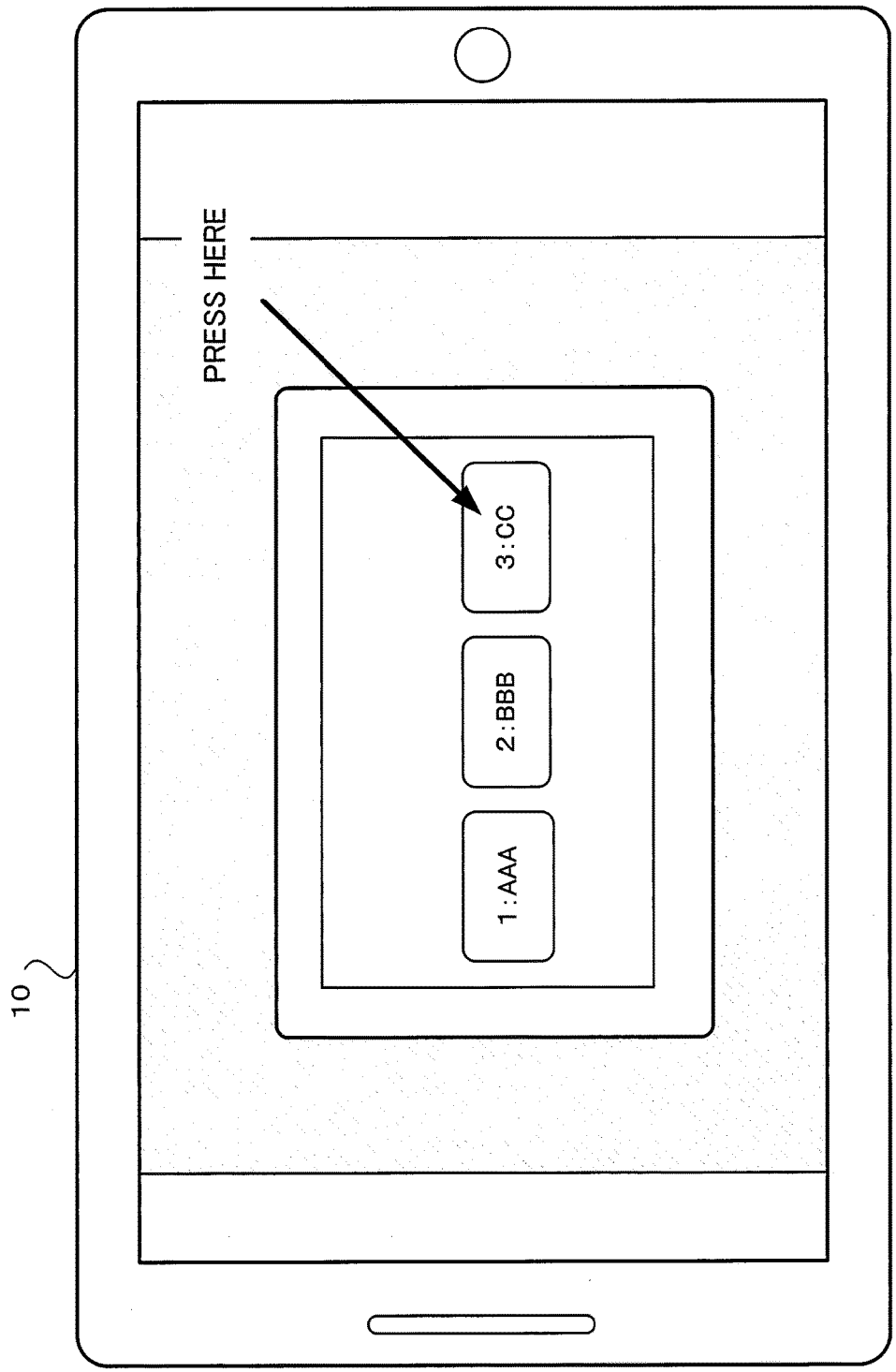
FIG. 9 is a view showing an operation guidance display example displayed at a display unit 37.

An operation guidance display example that is displayed at the display unit 37 in this manner is shown in FIG. 9. Referring to FIG. 9, it can be seen that operation guidance identifying an operation button to be operated in order to achieve the operation objective is displayed at the portable terminal device 10, superimposed on the captured image of the display panel 51 of the subject apparatus 50.

When a switch of display screen at the display panel 51 due to the user performing an operation in accordance with the operation guidance has been detected (step S109), the processing of steps S103 to S108 is repeated.

Figure 10:
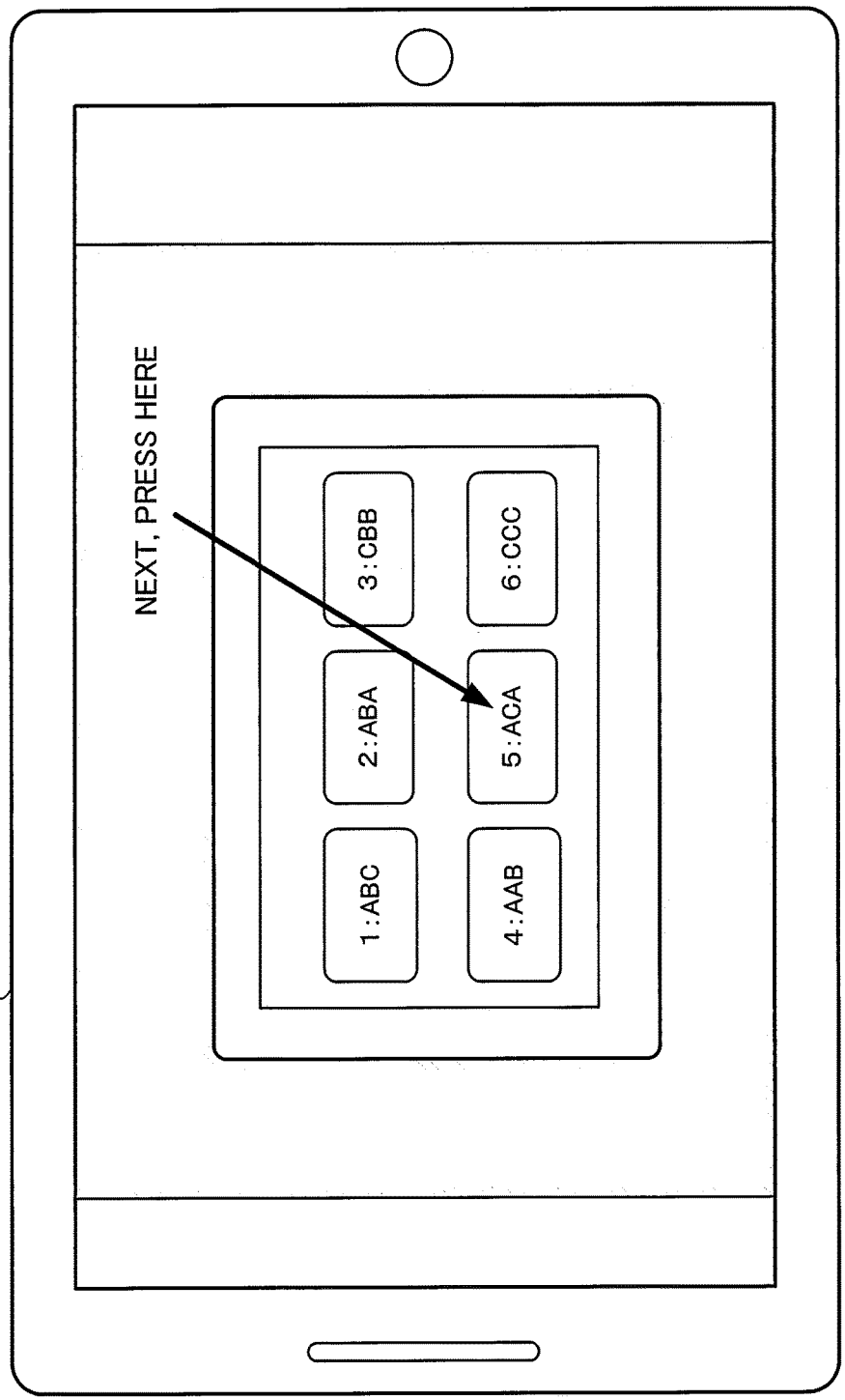
FIG. 10 is a view showing an operation guidance display example that is displayed at the display unit 37 after a switch of the display screen.

As a result, an operation guidance display example as illustrated in FIG. 10 is displayed at the display unit 37 of the portable terminal device 10. Referring to FIG. 10, it can be seen that operation guidance identifying the next operation button to be operated by the user is displayed superimposed on the display screen after the switch.

By repeatedly switching displays in this manner, operation guidance is implemented such that the user achieves the entered operation objective.

Repair Guidance Display

Figure 11:
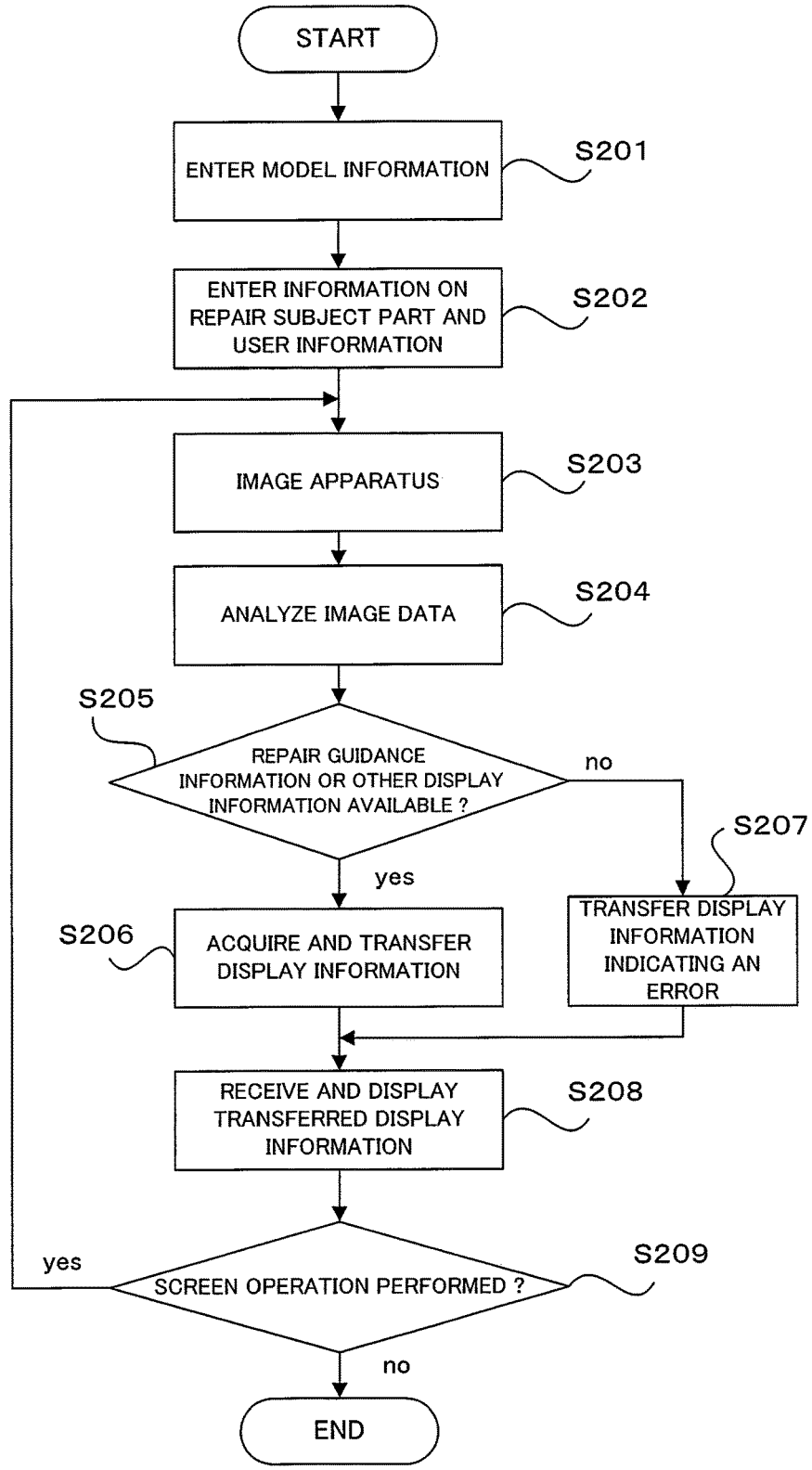
FIG. 11 is a flowchart describing operations when a service person images the subject apparatus 50 with the portable terminal device 10 and a repair guidance display is implemented.

Next, operation when a service person images the subject apparatus 50 with the portable terminal device 10 and repair guidance is displayed is described with reference to the flowchart of FIG. 11.

First, the operation information input unit 35 of the portable terminal device 10 accepts entry of model information of the subject apparatus 50 for which repair guidance is to be displayed through an operation screen as illustrated in FIG. 6 (step S201).

Then, the operation information input unit 35 of the portable terminal device 10 accepts entry of information on a repair subject part that is to be repaired, user information and the like (step S202).

Figure 12:
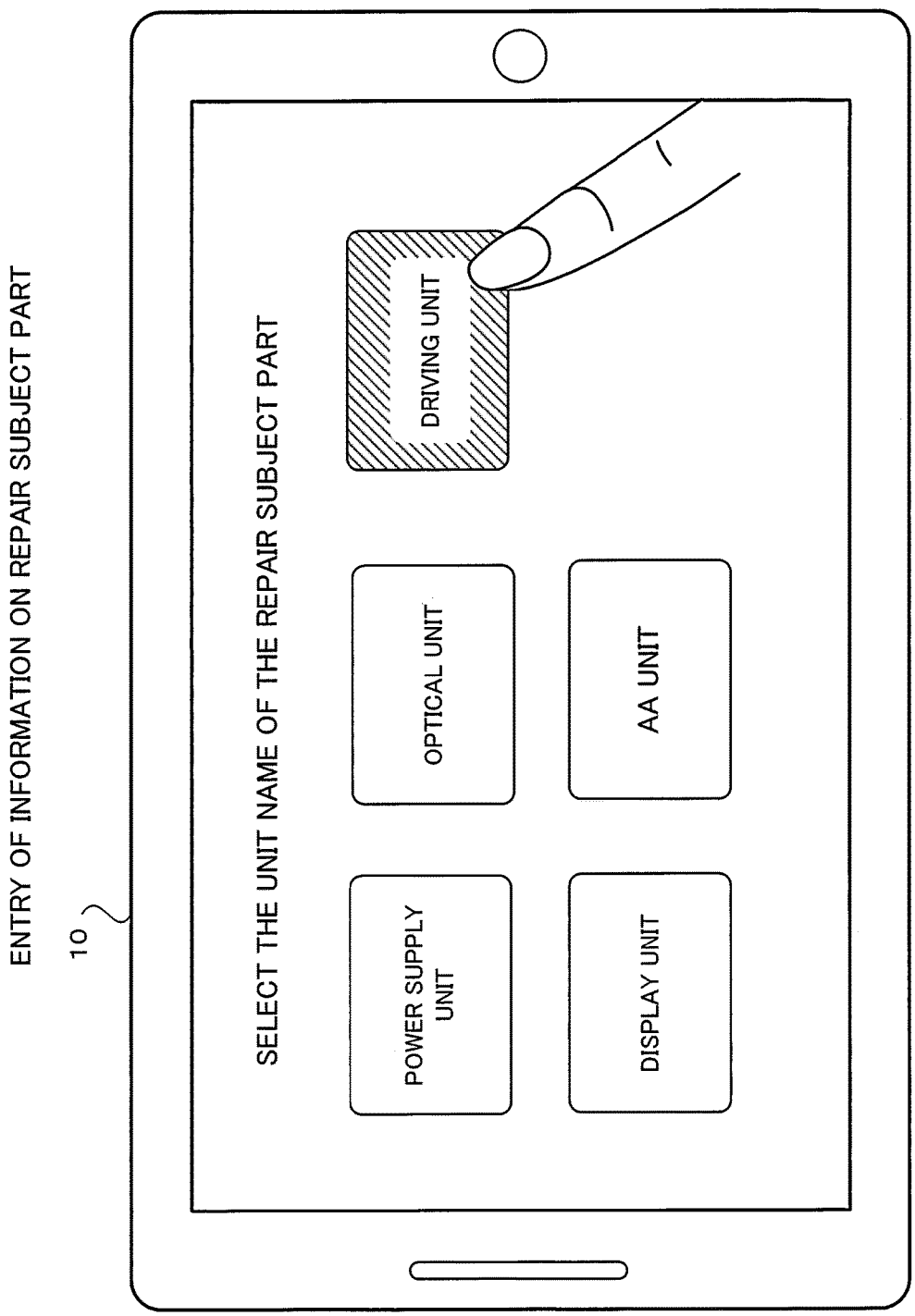
FIG. 12 is a view showing an operation screen example when the operation information input unit 35 accepts entry from a user of information on a repair subject part.
Figure 13:
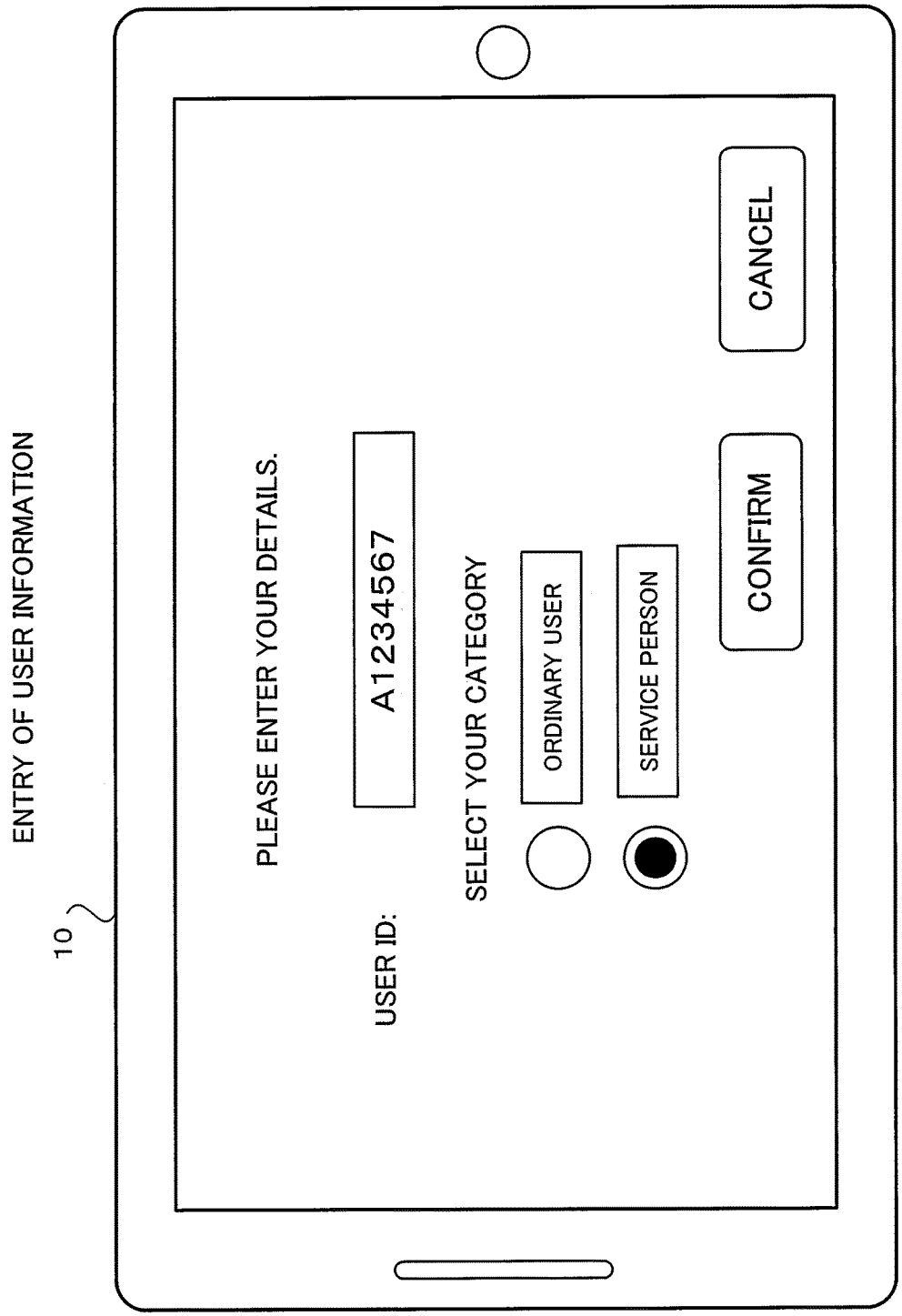
FIG. 13 is a view showing an operation screen example when the operation information input unit 35 accepts entry of user information from a user.

For example, the operation information input unit 35 accepts entry from the user of information on the repair subject part that is to be repaired through an operation screen as illustrated in FIG. 12. Through an operation screen as illustrated in FIG. 13, the operation information input unit 35 also accepts entry from the user of, as attribute information of the user carrying out the repair, a user ID (user identification information) and information on whether the user is an ordinary user, a service person or the like.

Because attribute information of the user is entered in this way, display information corresponding to the attributes of the user may be acquired and displayed. More specifically, when the user is an ordinary user, display information presenting a simple repair procedure that can be carried out by an ordinary user is displayed, and when the user is an expert user such as a service person or the like, the display may be switched to display a service manual presenting a detailed repair procedure.

Figure 14:
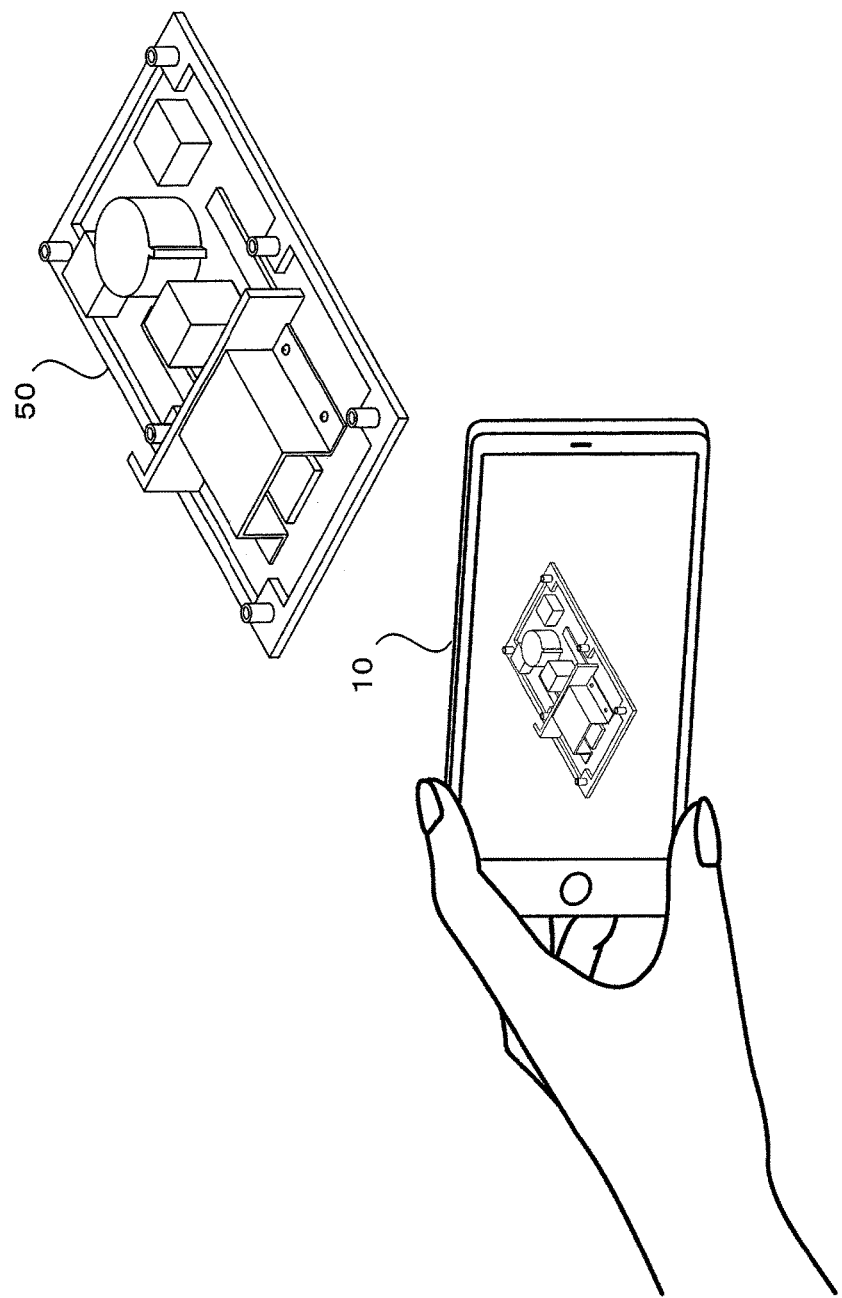
FIG. 14 is a view describing a situation in which an internal part of the subject apparatus 50 is imaged by the image capture unit 31.

Then, imaging of the subject apparatus 50 is implemented by the image capture unit 31 (step S203). Because the aim is to display repair guidance, as illustrated in FIG. 14, an internal part of the subject apparatus 50 is imaged by the image capture unit 31 in a state in which a housing cover has been removed. This imaging by the image capture unit 31 need not be capture of a still image; a moving image of the display panel 51 may be captured by the image capture unit 31.

Correspondingly, image data of the internal part captured by the image capture unit 31 and information such as apparatus information, user attribute information and the like accepted by the operation information input unit 35 are transmitted to the server device 20 by the transmission unit 32. At the server device 20, an analysis of the transmitted image data is carried out by the information analysis unit 41 using the trained learning model, and the location of the imaged internal part is identified (step S204). Hence, the information analysis unit 41 determines whether or not display information relating to the identified internal part is available (step S205). This display information relating to the internal part is service manual information for repairing the internal part of the subject apparatus 50, information relating to component names of the internal part, repair guidance information presenting a method for repairing the internal part, or the like.

When the server device 20 determines that display information to be displayed is available, the display information acquisition unit 42 acquires the display information to be displayed from the information memorization unit 43, and the acquired display information is transferred to the portable terminal device 10 by the transfer unit 44 (step S206).

However, when the server device 20 determines that no display information to be displayed is available, the display information acquisition unit 42 transfers display information indicating an error to the portable terminal device 10 through the transfer unit 44 (step S207).

At the portable terminal device 10, the display information transferred from the server device 20 is received by the reception unit 33, and the received display information is displayed at the display unit 37 by the display control unit 36 (step S208).

The user performs the repair in accordance with the repair guidance and instructs switching to subsequent displays. When a screen operation such as a repair completion entry or the like is detected (step S209), the processing of steps S203 to S208 is repeated.

Figure 15:
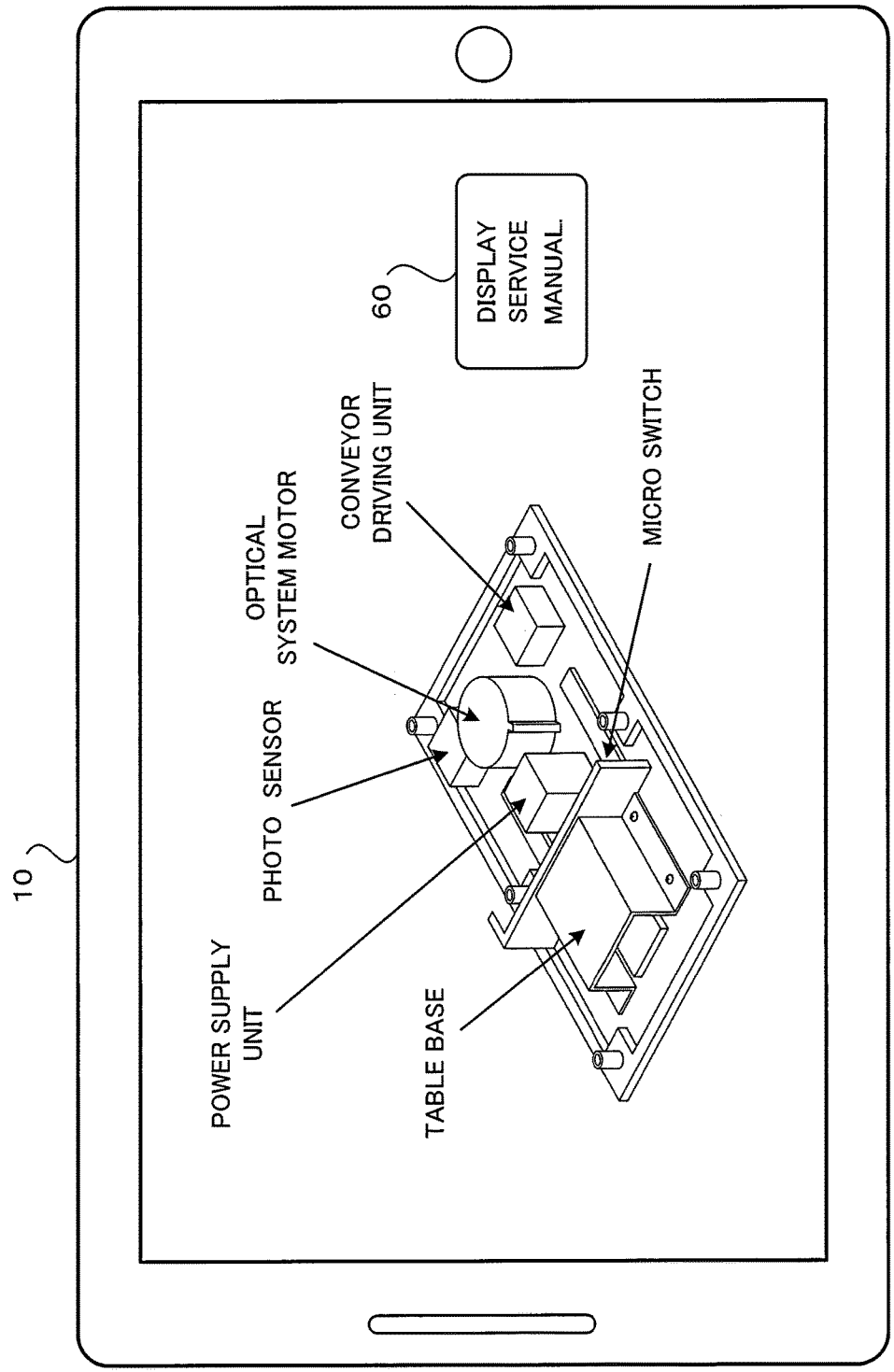
FIG. 15 is a view showing a situation in which text information representing names of components of an internal part of the subject apparatus 50 is displayed superimposed on a captured image of the internal part.

Repair guidance display examples displayed at the display unit 37 in this manner are shown in FIG. 15 and FIG. 16.

In the repair guidance display example shown in FIG. 15, text information showing names of components of an internal part of the subject apparatus 50 are displayed superimposed on a captured image of the internal part.

In the display screen example shown in FIG. 15, an operation button 60 marked "Display service manual" is displayed. When a user presses the operation button 60, the service manual of the imaged subject apparatus 50 is displayed. The service manual may be displayed in a state in which the service manual is opened to, of pages of the service manual, a page relating to the imaged internal part.

When the site of a portion of the internal part of the subject apparatus 50 is magnified and imaged by the image capture unit 31, a page of the service manual relating to the imaged subject site may be displayed automatically, and repair guidance presenting a repair procedure relating to this subject site may be displayed automatically.

For example, when an image of a "table base" portion is captured in a state in which the housing cover is removed, the learning model of the information analysis unit 41 recognizes the vicinity of the table base from nearby mechanical structures, structural components, positional relationships with the surroundings, and the like. Hence, the display information acquisition unit 42 acquires display information of a page of the service manual relating to the table base, and the acquired display information of the page of the service manual relating to the table base is displayed at the display unit 37.

In the display screen example shown in FIG. 16, image information presenting a repair procedure for conducting an "AAA unit replacement procedure" is displayed as repair guidance information. A user can implement the details of the targeted repair by sequentially conducting repair operations on the subject apparatus 50 while looking at the repair guidance information.

A Configuration Realized with Just a Portable Terminal Device

In the exemplary embodiment described above, operation guidance information and repair guidance information are memorized at the server device 20, and the portable terminal device 10 is configured to transmit an image capturing the subject apparatus 50 to the server device 20 and display the display information acquired from the server device 20.

However, the functions of the server device 20 may be incorporated into a portable terminal device and the functions as described above may be realized by the portable terminal device alone. Functional structures of the portable terminal device 10A that is configured in this way are shown in FIG. 17.

As shown in FIG. 17, the portable terminal device 10A is provided with the image capture unit 31, the operation information input unit 35, the display control unit 36, the information analysis unit 41, the display information acquisition unit 42, the information memorization unit 43 and the display unit 37.

The operation information input unit 35, display control unit 36, information analysis unit 41, display information acquisition unit 42 and information memorization unit 43 are realized by installation of an app at the portable terminal device 10A.

The information analysis unit 41 identifies a part of the subject apparatus 50 that is included in an image captured by the image capture unit 31. The display information acquisition unit 42 refers to operation information accepted by the operation information input unit 35 and acquires display information to be displayed in correspondence with the part of the subject apparatus 50 identified by the information analysis unit 41 from the information memorization unit 43. The display control unit 36 causes the display information acquired by the display information acquisition unit 42 to be displayed at the display unit 37. On the basis of control by the display control unit 36, the display unit 37 displays the display information acquired by the display information acquisition unit 42.

Rather than a still image captured by the image capture unit 31, the display unit 37 may display the display information acquired by the display information acquisition unit 42 superimposed at a position corresponding with a position of the subject apparatus 50 in an image that is being captured by the image capture unit 31. For example, virtual reality (VR) goggles may be used instead of the portable terminal device 10, a moving image of the subject apparatus 50 may be captured, and the display information acquired by the display information acquisition unit 42 may be displayed superimposed at positions corresponding with a position of the subject apparatus 50 in the moving image that is being captured.

Variant Examples

In the present exemplary embodiment, displaying information such as operation guidance, repair guidance and the like for subject apparatuses that are automatic analysis devices such as a diabetes testing device, a urine testing device and the like is described. However, the present disclosure is similarly applicable to subject apparatuses that are apparatuses other than automatic analysis devices.

In the present exemplary embodiment, using a portable terminal device such as a smart phone, a tablet terminal or the like to display display information such as operation guidance information, repair guidance information and the like is described, but the present disclosure is not limited thus. Various information processing devices that are equipped with imaging functions may be used, such as laptop computers, video cameras and so forth, and the present disclosure is similarly applicable when displaying display information such as operation guidance information, repair guidance information and the like corresponding to a subject apparatus.

Supplementary Notes

Supplementary notes on preferred modes of the present disclosure are given below.

Supplementary Note 1

An information processing device includes: a memorization unit that memorizes display information to be displayed in correspondence with parts of an apparatus; an image capture unit that captures an image of the apparatus; an identification unit that identifies a part of the apparatus included in an image that has been captured or is being captured by the image capture unit; an acquisition unit that acquires, from the memorization unit, the display information that is to be displayed in correspondence with the part of the apparatus identified by the identification unit; and a display unit that displays the display information acquired by the acquisition unit.

Supplementary Note 2

In the information processing device according to supplementary note 1, when the part of the apparatus identified by the identification unit is a display panel of the apparatus, the acquisition unit acquires operation guidance information corresponding to display contents of the display panel as the display information from the memorization unit.

Supplementary Note 3

In the information processing device according to supplementary note 2, the identification unit determines a version of a software program installed at the apparatus on the basis of the display contents displayed at the display panel, and the acquisition unit acquires operation guidance information corresponding to the version of the software program determined by the identification unit as the display information from the memorization unit.

Supplementary Note 4

In the information processing device according to supplementary note 1, when the part of the apparatus identified by the identification unit is an internal part of the apparatus, the acquisition unit acquires information relating to the internal part as the display information from the memorization unit.

Supplementary Note 5

In the information processing device according to supplementary note 4, the display information includes at least one of service manual information for repairing the internal part, information relating to a component name of the internal part, and repair guidance information presenting a procedure for repairing the internal part.

Supplementary Note 6

In the information processing device according to any one of supplementary notes 1 to 5, the display unit displays the display information acquired by the acquisition unit superimposed at a position corresponding to a position of the apparatus in the image that has been captured or is being captured by the image capture unit.

Supplementary Note 7

In the information processing device according to any one of supplementary notes 1 to 6, the identification unit uses an image analysis model to identify the part of the apparatus included in the image that has been captured or is being captured by the image capture unit, the image analysis model being built beforehand of correspondences between a plurality of images relating to the apparatus and parts of the apparatus corresponding to the plurality of images.

Supplementary Note 8

In the information processing device according to supplementary note 7, the image analysis model is a trained learning model that is created by machine learning using training data constituted of the plurality of images relating to the apparatus and the parts of the apparatus corresponding to the plurality of images.

Supplementary Note 9

The information processing device according to any one of supplementary notes 1 to 8 further includes an input unit that accepts entry of information relating to the apparatus from a user, wherein the acquisition unit refers to information relating to the apparatus that is accepted by the input unit when acquiring the display information corresponding to the part of the apparatus identified by the identification unit from the memorization unit.

Supplementary Note 10

In the information processing device according to supplementary note 9, the input unit accepts entry of at least one of model name information of the apparatus, destination area information of the apparatus, unit name information of an internal part of the apparatus that has been imaged or is being imaged by the image capture unit, information relating to an operation objective of a user, user attribute information, and user identification information.

Supplementary Note 11

An information processing system includes: a terminal device including an image capture unit that captures an image of an apparatus, a transmission unit that transmits an image that has been imaged or is being imaged by the image capture unit, a reception unit that receives display information from an external device, and a display unit that displays the display information received by the reception unit; and a server device including a memorization unit that memorizes display information to be displayed in correspondence with parts of the apparatus, an identification unit that identifies a part of the apparatus included in the image transmitted by the transmission unit, an acquisition unit that acquires, from the memorization unit, the display information that is to be displayed in correspondence with the part of the apparatus identified by the identification unit, and a transfer unit that transfers the display information acquired by the acquisition unit to the terminal device.

Supplementary Note 12

A program for causing a computer to execute processing including: an image capture step of capturing an image of an apparatus; an identification step of identifying a part of the apparatus included in an image that has been captured or is being captured in the image capture step; an acquisition step of acquiring, from a memorization unit that memorizes display information to be displayed in correspondence with parts of the apparatus, the display information that is to be displayed in correspondence with the part of the apparatus identified in the identification step; and a display step of displaying the display information acquired in the acquisition step.

Supplementary Note 13

A non-transitory recording medium records a program for causing a computer to execute: processing including: an image capture step of capturing an image of an apparatus; an identification step of identifying a part of the apparatus included in an image that has been captured or is being captured in the image capture step; an acquisition step of acquiring, from a memorization unit that memorizes display information to be displayed in correspondence with parts of the apparatus, the display information that is to be displayed in correspondence with the part of the apparatus identified in the identification step; and a display step of displaying the display information acquired in the acquisition step.

What is claimed is:

1. An information processing device comprising:
    a memorization unit that memorizes display information to be displayed in correspondence with parts of an apparatus;
    an image capture unit that captures an image of the apparatus;
    an identification unit that identifies a part of the apparatus included in an image that has been captured or is being captured by the image capture unit;
    an acquisition unit that acquires, from the memorization unit, the display information that is to be displayed in correspondence with the part of the apparatus identified by the identification unit; and
    a display unit that displays the display information acquired by the acquisition unit;
    wherein the identification unit uses an image analysis model to identify the part of the apparatus included in the image that has been captured or is being captured by the image capture unit, the image analysis model being built beforehand of correspondences between a plurality of images relating to the apparatus and parts of the apparatus corresponding to the plurality of images.

2. The information processing device according to claim 1, wherein, when the part of the apparatus identified by the identification unit is a display panel of the apparatus, the acquisition unit acquires operation guidance information corresponding to display contents of the display panel as the display information from the memorization unit.

3. The information processing device according to claim 2, wherein
    the identification unit determines a version of a software program installed at the apparatus on the basis of the display contents displayed at the display panel, and
    the acquisition unit acquires operation guidance information corresponding to the version of the software program determined by the identification unit as the display information from the memorization unit.

4. The information processing device according to claim 1, wherein, when the part of the apparatus identified by the identification unit is an internal part of the apparatus, the acquisition unit acquires information relating to the internal part as the display information from the memorization unit.

5. The information processing device according to claim 4, wherein the display information includes at least one of service manual information for repairing the internal part, information relating to a component name of the internal part, and repair guidance information presenting a procedure for repairing the internal part.

6. The information processing device according to claim 1, wherein the display unit displays the display information acquired by the acquisition unit superimposed at a position corresponding to a position of the apparatus in the image that has been captured or is being captured by the image capture unit.

7. The information processing device according to claim 1, wherein the image analysis model is a trained learning model that is created by machine learning using training data constituted of the plurality of images relating to the apparatus and the parts of the apparatus corresponding to the plurality of images.

8. The information processing device according to claim 1, further comprising an input unit that accepts entry of information relating to the apparatus from a user,
    wherein the acquisition unit refers to information relating to the apparatus that is accepted by the input unit when acquiring the display information corresponding to the part of the apparatus identified by the identification unit from the memorization unit.

9. The information processing device according to claim 8, wherein the input unit accepts entry of at least one of model name information of the apparatus, destination area information of the apparatus, unit name information of an internal part of the apparatus that has been imaged or is being imaged by the image capture unit, information relating to an operation objective of a user, user attribute information, and user identification information.

10. An information processing system comprising:
    a terminal device including
        an image capture unit that captures an image of an apparatus,
        a transmission unit that transmits an image that has been imaged or is being imaged by the image capture unit,
        a reception unit that receives display information from an external device, and
        a display unit that displays the display information received by the reception unit; and
    a server device including
        a memorization unit that memorizes display information to be displayed in correspondence with parts of the apparatus,
        an identification unit that identifies a part of the apparatus included in the image transmitted by the transmission unit,
        an acquisition unit that acquires, from the memorization unit, the display information that is to be displayed in correspondence with the part of the apparatus identified by the identification unit, and
        a transfer unit that transfers the display information acquired by the acquisition unit to the terminal device;
    wherein the identification unit uses an image analysis model to identify the part of the apparatus included in the image that has been captured or is being captured by the image capture unit, the image analysis model being built beforehand of correspondences between a plurality of images relating to the apparatus and parts of the apparatus corresponding to the plurality of images.

11. A non-transitory recording medium recording a program for causing a computer to execute processing comprising:
    an image capture step of capturing an image of an apparatus;
    an identification step of identifying a part of the apparatus included in an image that has been captured or is being captured in the image capture step;

an acquisition step of acquiring, from a memorization unit that memorizes display information to be displayed in correspondence with parts of the apparatus, the display information that is to be displayed in correspondence with the part of the apparatus identified in the identification step; and a display step of displaying the display information acquired in the acquisition step;

wherein the identification step uses an image analysis model to identify the part of the apparatus included in the image that has been captured or is being captured in the image capture step, the image analysis model being built beforehand of correspondences between a plurality of images relating to the apparatus and parts of the apparatus corresponding to the plurality of images.

* * * * *